United States Patent
Mitrovic et al.

(10) Patent No.: US 11,615,222 B2
(45) Date of Patent: Mar. 28, 2023

(54) INERTIA SCALING BASED ON NEIGHBORING BODIES

(71) Applicant: Microsoft Technology Licensing, LLC, Redmond, WA (US)

(72) Inventors: Petar Mitrovic, Belgrade (RS); Eoin McLoughlin, Dublin (IE); Maxwell Simon Abernethy, San Francisco, CA (US); Milan Simic, Belgrade (RS); Milos Jovanovic, Belgrade (RS); Nikola Nikolic, Belgrade (RS); Oliver M. Strunk, Munich (DE); Pavle Josipovic, Belgrade (RS); Rory Mullane, Dublin (IE); Janos Benk, Munich (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 504 days.

(21) Appl. No.: 16/576,680

(22) Filed: Sep. 19, 2019

(65) Prior Publication Data

US 2021/0089629 A1    Mar. 25, 2021

(51) Int. Cl.
  *G06F 30/20*    (2020.01)
  *G06T 19/20*    (2011.01)
  (Continued)

(52) U.S. Cl.
  CPC .......... *G06F 30/20* (2020.01); *G01G 19/414* (2013.01); *G01P 15/08* (2013.01); *G06T 19/20* (2013.01);
  (Continued)

(58) Field of Classification Search
  CPC ... G06F 30/20; G06F 2111/04; G01G 19/414; G01P 15/08
  See application file for complete search history.

(56) References Cited

U.S. PATENT DOCUMENTS 6,054,702 A * 4/2000 Davis ................... G01P 15/125
                                                      250/205
6,374,255 B1 * 4/2002 Peurach ................. G06F 3/016
                                                     707/999.102

(Continued)

OTHER PUBLICATIONS

"Friction", Retreived From: https://en.wikipedia.org/wiki/Friction, Retrieved Date: Sep. 6, 2019, 17 Pages.

(Continued)

*Primary Examiner* — Akash Saxena
(74) *Attorney, Agent, or Firm* — Alleman Hall Creasman & Tuttle LLP

(57) ABSTRACT

A physics engine executed on a processor to simulate rigid body dynamics of a simulated physical system using an inertia scaling function is provided. The physics engine may be configured to iteratively loop through a collision detection phase, an iterative solving phase, updating phase, and display phase. The physics engine may further be configured to determine a neighboring body weighting value for one or more of the plurality of bodies, and determine an inertia scaling value for the one or more of the plurality of bodies based on the neighboring body weighting value for that body. The physics engine may further be configured to scale an inertia value for a body of that colliding pair of bodies based on the inertia scaling value for the iterative solving phase.

18 Claims, 10 Drawing Sheets

(51) Int. Cl.
    *A63F 13/577* (2014.01)
    *A63F 13/573* (2014.01)
    *G01G 19/414* (2006.01)
    *G01P 15/08* (2006.01)
    *G06F 111/04* (2020.01)

(52) U.S. Cl.
    CPC .......... *A63F 13/573* (2014.09); *A63F 13/577* (2014.09); *G06F 2111/04* (2020.01); *G06T 2210/21* (2013.01)

(56) References Cited

U.S. PATENT DOCUMENTS

| | | | | | |
|---|---|---|---|---|---|
| 6,850,806 | B2* | 2/2005 | Yutkowitz | ............... | G05B 11/28 700/37 |
| 6,859,747 | B2* | 2/2005 | Yutkowitz | ............ | G05B 19/404 318/568.1 |
| 7,084,869 | B2* | 8/2006 | Sriram | .................... | G06T 19/00 463/32 |
| 7,505,883 | B2* | 3/2009 | Leprevost | ............... | G06T 13/20 703/2 |
| 8,970,602 | B2* | 3/2015 | Mukai | .................... | G06T 13/20 345/473 |
| 9,195,794 | B2* | 11/2015 | Dariush | .................. | G06F 30/15 |
| 9,613,449 | B2* | 4/2017 | Mueller-Fischer | ..... | G06T 13/20 |
| 9,844,878 | B2* | 12/2017 | Haddadin | .............. | B25J 9/1666 |
| 10,474,927 | B2* | 11/2019 | Yang | .................... | G06K 9/6247 |
| 10,793,148 | B2* | 10/2020 | Kim | .................... | B60W 10/18 |
| 10,838,415 | B2* | 11/2020 | Dougherty | ............ | G06F 21/316 |
| 10,885,242 | B2* | 1/2021 | Simic | .................... | G06F 30/17 |
| 11,030,363 | B2* | 6/2021 | Strunk | .................... | G06F 30/20 |
| 11,200,356 | B2* | 12/2021 | Storey | .................... | G06F 30/20 |
| 2003/0056147 | A1* | 3/2003 | Yutkowitz | ............... | G05B 11/42 714/25 |
| 2003/0112281 | A1* | 6/2003 | Sriram | .................... | A63F 13/10 345/619 |
| 2005/0187742 | A1* | 8/2005 | Collodi | .................. | G06F 30/20 703/2 |
| 2006/0149516 | A1* | 7/2006 | Bond | ..................... | A63F 13/80 703/6 |
| 2006/0217945 | A1* | 9/2006 | Leprevost | ............... | G06F 17/11 703/2 |
| 2006/0262113 | A1* | 11/2006 | Leprevost | ............... | G06T 13/20 717/100 |
| 2013/0268256 | A1* | 10/2013 | Dariush | .................. | G06F 30/15 703/8 |
| 2014/0244222 | A1* | 8/2014 | Tonge | .................... | G06F 30/20 703/2 |
| 2014/0358505 | A1* | 12/2014 | Hashash | ................. | G06F 30/23 703/2 |
| 2015/0239124 | A1* | 8/2015 | Haddadin | .............. | B25J 9/1676 700/255 |
| 2017/0344680 | A1* | 11/2017 | Strunk | .................... | G06F 30/20 |
| 2018/0247158 | A1* | 8/2018 | Yang | .................... | G06K 9/6214 |
| 2019/0046373 | A1* | 2/2019 | Coulter | ................. | H04L 9/0841 |
| 2019/0072984 | A1* | 3/2019 | Dougherty | ............ | B64C 39/024 |
| 2019/0108300 | A1* | 4/2019 | Soler Arasanz | ........ | G06T 17/20 |
| 2022/0100928 | A1* | 3/2022 | Storey | .................... | G06F 30/20 |

OTHER PUBLICATIONS

Bodin, et al., "Notes on the SPOOK Method for Simulating Constrained mechanical Systems", Retrieved from: https://www8.cs.umu.se/kurser/5DV058/VT15/lectures/SPOOKlabnotes.pdf, 2009, 11 Pages.

Catto, Erin, "Fast and Simple Physics using Sequential Impulses", In Proceedings of Games Developer Conference, 2006, 53 Pages.

Catto, Erin, "Modelling and Solving Constraints", Retreived From: http://twvideo01.ubm-us.net/o1/vault/gdc09/slides/04-GDC09_Catto_Erin_Solver.pdf, Retreived Date: Sep. 6, 2019, 81 Pages.

"Physics for Game Programmers:Understanding Constraints", Retreived From: https://80.lv/articles/physics-for-game-programmers-understanding-constraints/, Mar. 4, 2018, 05 Pages.

Featherstone, Roy, "Rigid Body Dynamics Algorithms", In Publication of Springer, 2008, 281 Pages.

Lacoursiere, Claude, "Using Gauss-Seidel for Multibody Problems", In the Dissertation Submitted to Department of Computing Science, Umea University, Dec. 1, 2011, 6 Pages.

Mendez, Jose Maria, "Physics 101 #3: Solvers", Retreived From: http://blog.virtualmethodstudio.com/2017/11/physics-101-3-solvers/, Nov. 21, 2017, 7 Pages.

Mirtich, Brian Vincent, "Impulse-based Dynamic Simulation of Rigid Body Systems", In the Dissertation Submitted to University Of California, 1996, 259 Pages.

Moravanszky, et al., "Fast Contact Reduction for Dynamics Simulation", In Proceedings of Game Programming Gems, 2004, 10 Pages.

Tamis, Marijn, "3D Constraint Derivations for Impulse Solvers", Retreived Form: http://www.mft-spirit.nl/files/MTamis_Constraints.pdf, Jul. 1, 2015, 41 Pages.

Tamis, et al., "Constraint Based Physics Solver", Retreived From: http://www.mft-spirit.nl/files/MTamis_ConstraintBasedPhysicsSolver.pdf, Jun. 15, 2015, 31 Pages.

Tonge, et al., "Mass Splitting for Jitter-Free Parallel Rigid Body Simulation", In Journal of Transactions on ACM Graphics, vol. 31, Issue 4, Jul. 2012, 8 Pages.

Tonge, Richard, "Solving Rigid Body Contacts", In Proceedings of the Game Developers Conference, Mar. 5, 2012, 59 Pages.

Tournier, et al., "Stable Constrained Dynamics", In Journal of ACM Transactions on Graphics, vol. 34, Issue 4, Aug. 2015, 11 Pages.

"Advanced Collision Detection—NVIDIA PhysX SOK 3.4.0 Documentation", Retrieved from: https://web.archive.org/web/20190408095336/https://docs.nvidia.com/gameworks/content/gameworkslibrary/physx/guide/Manual/AdvancedCollisionDetection.html, Apr. 8, 2019, 8 Pages.

"Inertia", Retrieved From https://en.wikipedia.org/wiki/Inertia, Retrieved on: Sep. 13, 2019, 6 Pages.

"Rigid Body Dynamics", Retrieved from: https://web.archive.org/web/20190105002951/http://gameworksdocs.nvidia.com/PhysX/4.0/documentation/PhysXGuide/Manual/RigidBodyDynamics.html, Jan. 5, 2019, 17 Pages.

Bender, et al., "Position-Based Simulation Methods in Computer Graphics", In Journal of Eurographics, 2015, 32 Pages.

"International Search Report and the Written Opinion Issued in PCT Application No. PCT/US20/038548", dated Oct. 29, 2020, 13 Pages.

* cited by examiner

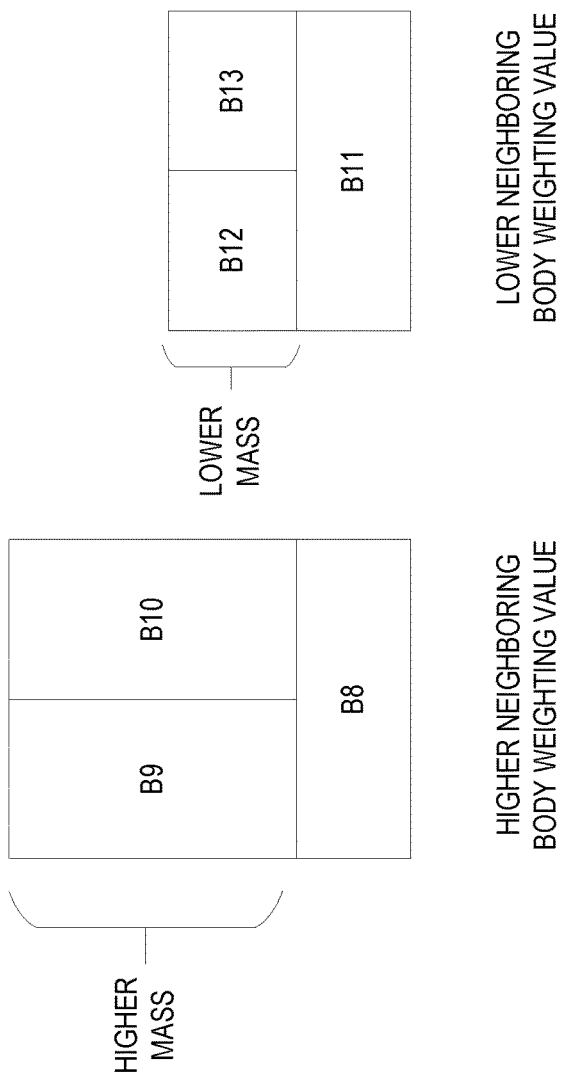
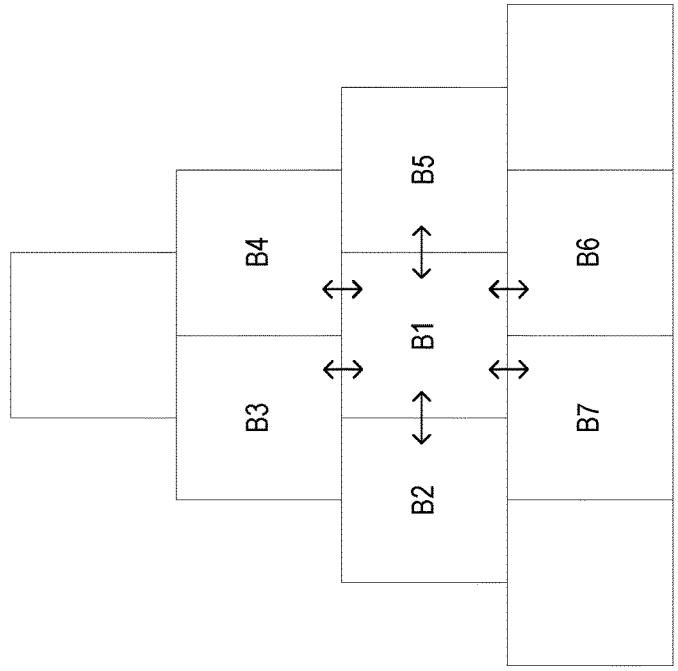
FIG. 6A
FIG. 6B
FIG. 6C

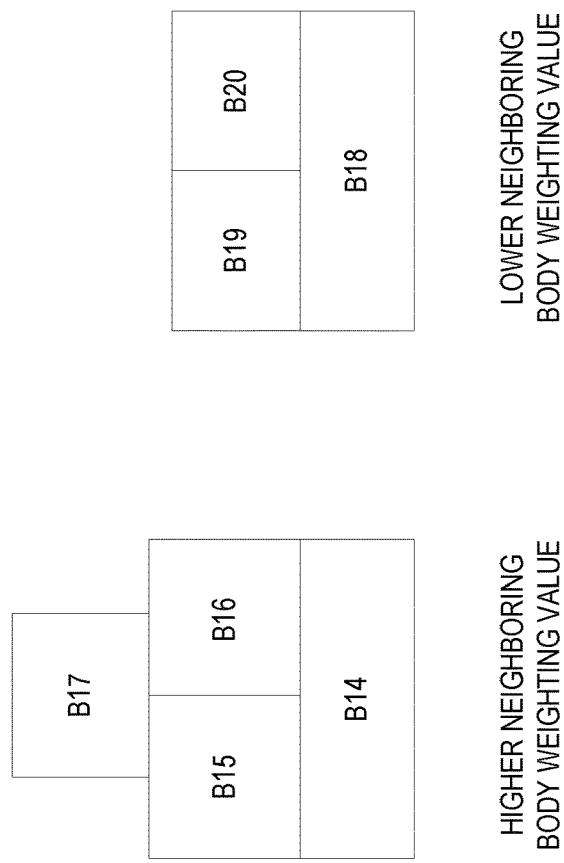
NEIGHBORING BODY WEIGHTING VALUE BASED ON NUMBER OF OTHER BODIES LOCATED ABOVE
HIGHER NEIGHBORING BODY WEIGHTING VALUE
FIG. 7B
LOWER NEIGHBORING BODY WEIGHTING VALUE
FIG. 7C
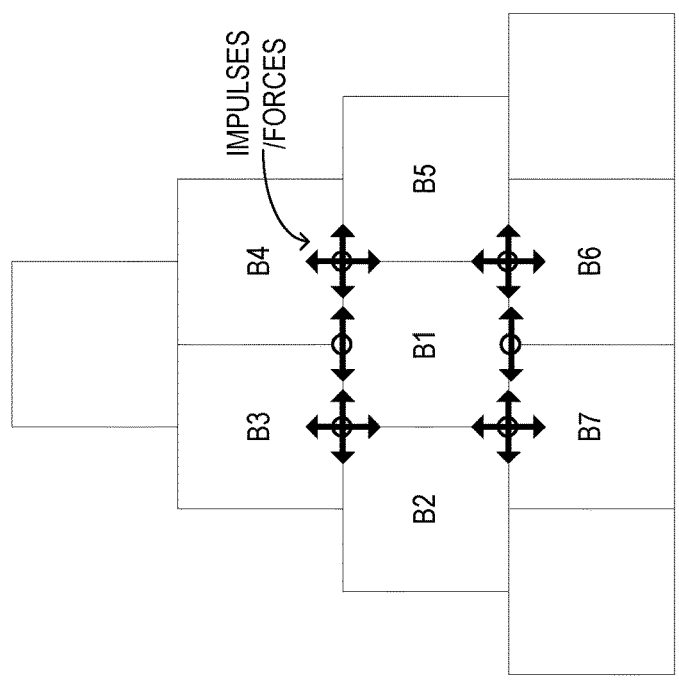
NEIGHBORING BODY WEIGHTING VALUE BASED ON NUMBER OF FORCES OR IMPULSES THAT HAVE BEEN APPLIED TO THE BODY
FIG. 7A

INERTIA SCALING BASED ON NEIGHBORING BODIES

BACKGROUND

Physics engines with iterative rigid body dynamics solvers are used in a variety of computer graphics applications, to simulate the motion of rigid bodies in real-time in a simulated physical environment. Such solvers do not find perfect solutions, but rather find approximate solutions. It is a challenge therefore, of such solvers to find approximate solutions quickly, efficiently, and sufficiently accurately for the needs of the application. One area in particular that physics engines face challenges is efficiently simulating stable stacks of rigid bodies and handling angular velocities that may potentially destabilize those stacks. These challenges, the manner in which they are addressed, and the attendant potential beneficial technical effects thereof are further discussed below.

SUMMARY

According to one aspect of the present disclosure, a computing device is provided which includes a processor configured to execute a physics engine to simulate rigid body dynamics of a simulated physical system including a plurality of bodies. The physics engine may be configured to iteratively loop through a collision detection phase, an iterative solving phase, updating phase, and display phase. The physics engine may further be configured to, in a current collision detection phase, identify colliding pairs of bodies of the plurality of bodies, determine collision information including a plurality of contact points for the identified colliding pairs of bodies, determine a neighboring body weighting value for one or more of the plurality of bodies, and determine an inertia scaling value for the one or more of the plurality of bodies based on the neighboring body weighting value for that body. The physics engine may further be configured to in a current iterative solving phase, for each solver iteration, for one or more colliding pairs of bodies, for one or more contact points between that colliding pair of bodies, scale an inertia value for a body of that colliding pair of bodies based on the inertia scaling value, the inertia value being scaled for the current iterative solving phase, solve a constraint for that contact point using the scaled inertia value for the body of that colliding pair of bodies, and accumulate results of constraint solving. The physics engine may further be configured to, in an updating phase, update positions of the colliding pairs of bodies based on a result of the current iterative solving phase. The physics engine may be further configured to, in a display phase, output data representations of the plurality of bodies to a display associated with the computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6A shows a calculation of a neighboring body weighting value for the inertia scaling function for the physics engine implemented by the computing device of FIG. 1.

FIGS. 6B and 6C show another calculation for determining a neighboring body weighting value for the inertia scaling function for the physics engine implemented by the computing device of FIG. 1.

FIG. 7A shows another calculation of a neighboring body weighting value for the inertia scaling function for the physics engine implemented by the computing device of FIG. 1.

FIGS. 7B and 7C show another calculation for determining a neighboring body weighting value for the inertia scaling function for the physics engine implemented by the computing device of FIG. 1.

DETAILED DESCRIPTION

Physics engines with iterative rigid body dynamics solvers are used in a variety of computer graphics applications, to simulate the motion of rigid bodies in real-time in a simulated physical environment. Each simulation step of these physics engines typically includes collision detection, applying impulses or forces or delta positions (i.e. solving), and integrating bodies. Example solvers for a physics engine include Gauss-Seidel solvers, Jacobian solvers, and other types of iterative solvers. However, because Gauss-Seidel and other types of iterative solvers may solve constraints separately and/or over several iterations, these solvers may potentially produce intermediate states and velocities that are not representative of actual states of the rigid bodies being simulated.

Typically, the intended behavior during simulation of a stack of rigid bodies is to counteract gravity and maintain stability of the stack. However, each impulse that is applied to a contact point during the solving phase may produce both linear and angular velocity changes to the associated body. These angular velocity changes produced by the iterative solver may potentially lead to artifacts and cause unintended behavior such as, for example, rigid bodies sliding or drifting in the stack when those rigid bodies would be expected by users to remain still, potentially degrading user experience of the application.

Figure 1:
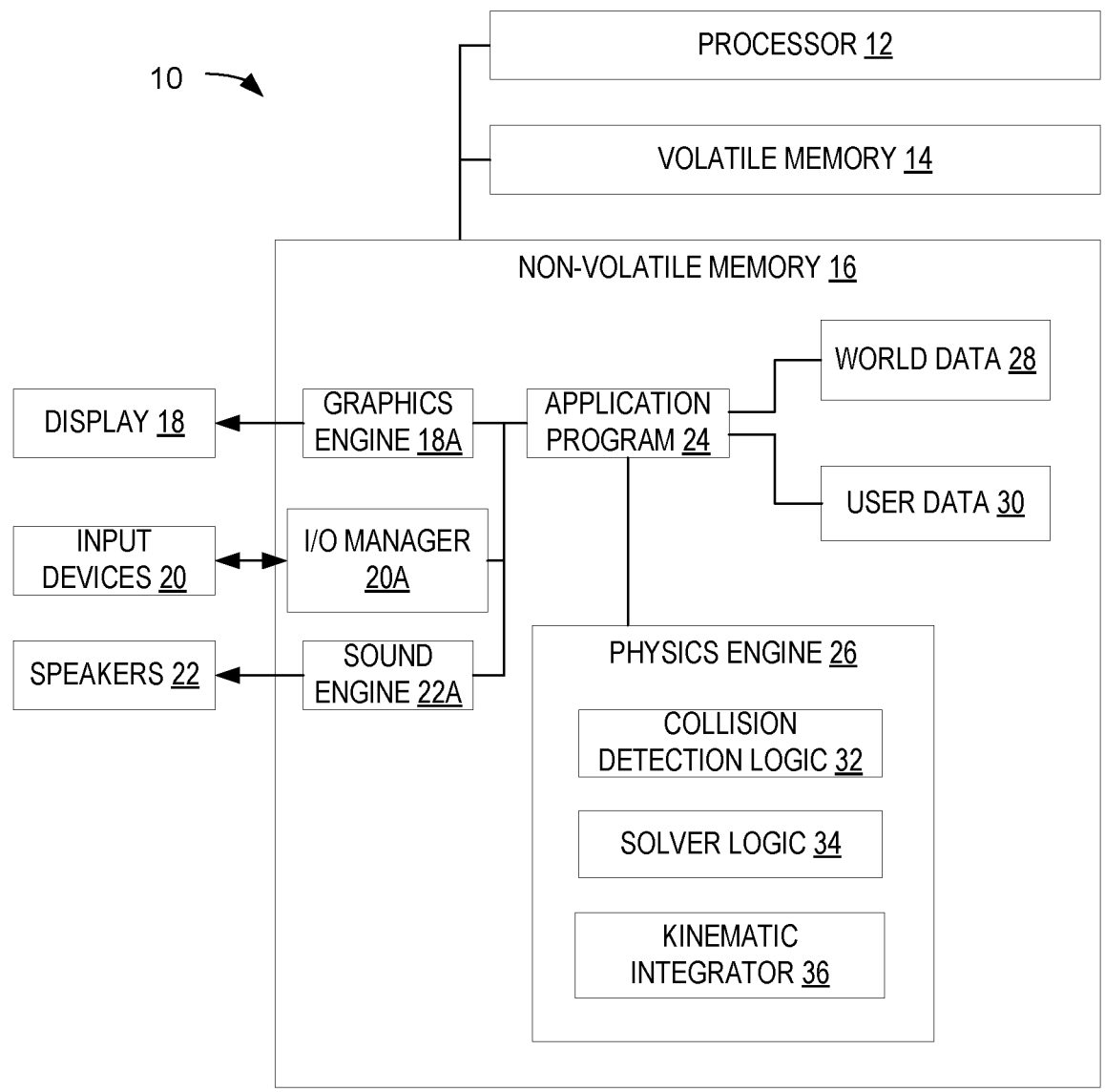
FIG. 1 shows a computing device equipped with a physics engine having a rigid body dynamics solver that implements an inertia scaling function, according to one embodiment of the present disclosure.

To address these issues, FIG. 1 illustrates a computing device 10 configured with a physics engine having a rigid body dynamics solver, according to one embodiment of the present disclosure. Computing device 10 includes a processor 12, volatile memory 14 such as RAM, non-volatile memory 16 such as a hard disk or FLASH memory, a display 18, input devices 20 such as a mouse, keyboard, touchscreen, etc., and one or more speakers 22. The processor 12 is configured to execute various software programs, such as application program 24, which are stored in non-volatile memory 16, using portions of volatile memory 14. Drivers such as a graphics engine 18A, an I/O manager 20A, and sound engine 22A enable communication between application program 24 and the display 18, input devices 20 and speakers 22, respectively. Application program 24 may be a computer game, or virtually any other type of program that utilizes a physics engine 26 that simulates rigid body dynamics in response to user inputs and program logic.

Application program 24 is configured to utilize and processor 12 is configured to execute a physics engine 26 to simulate the rigid body dynamics of a simulated physical system including a plurality of bodies. Data representing these physical bodies is stored as world data 28 and user data 30. It will be appreciated that physics engine 26 is provided with a function for inertia scaling, as will be described in more detail below. At a high level, the physics engine includes collision detection logic 32, solving logic 34, and a kinematic integrator 36, which are applied iteratively by the physics engine 26 to adjust the positions and velocities of various rigid bodies in the physical system, in order to make them behave appropriately under applied forces, such as gravity, wind resistance, springs, magnetism, etc., as well as observe physical constraints, such as non-penetration of other rigid bodies, joint constraints, etc. Collision detection logic 32, solver logic 34, and kinematic logiv 36 are typically software programs executed by the processor 12, which may be a multi-threaded and possibly multi-core central processing unit (CPU). However, in some embodiments portions or all of the logic of the physics engine 26 described herein may be implemented in firmware or hardware, for example on a graphical processing unit (GPU). Further, as will be described in more detail below, in one example, the physics engine 26 may be stateless and deterministic, and portions or all of the solver logic 34 may be accelerated by a GPU. However, it should be appreciated that the techniques described herein are also applicable to physics engines that implement extra state information to correct artifact/errors in the simulation.

Figure 2:
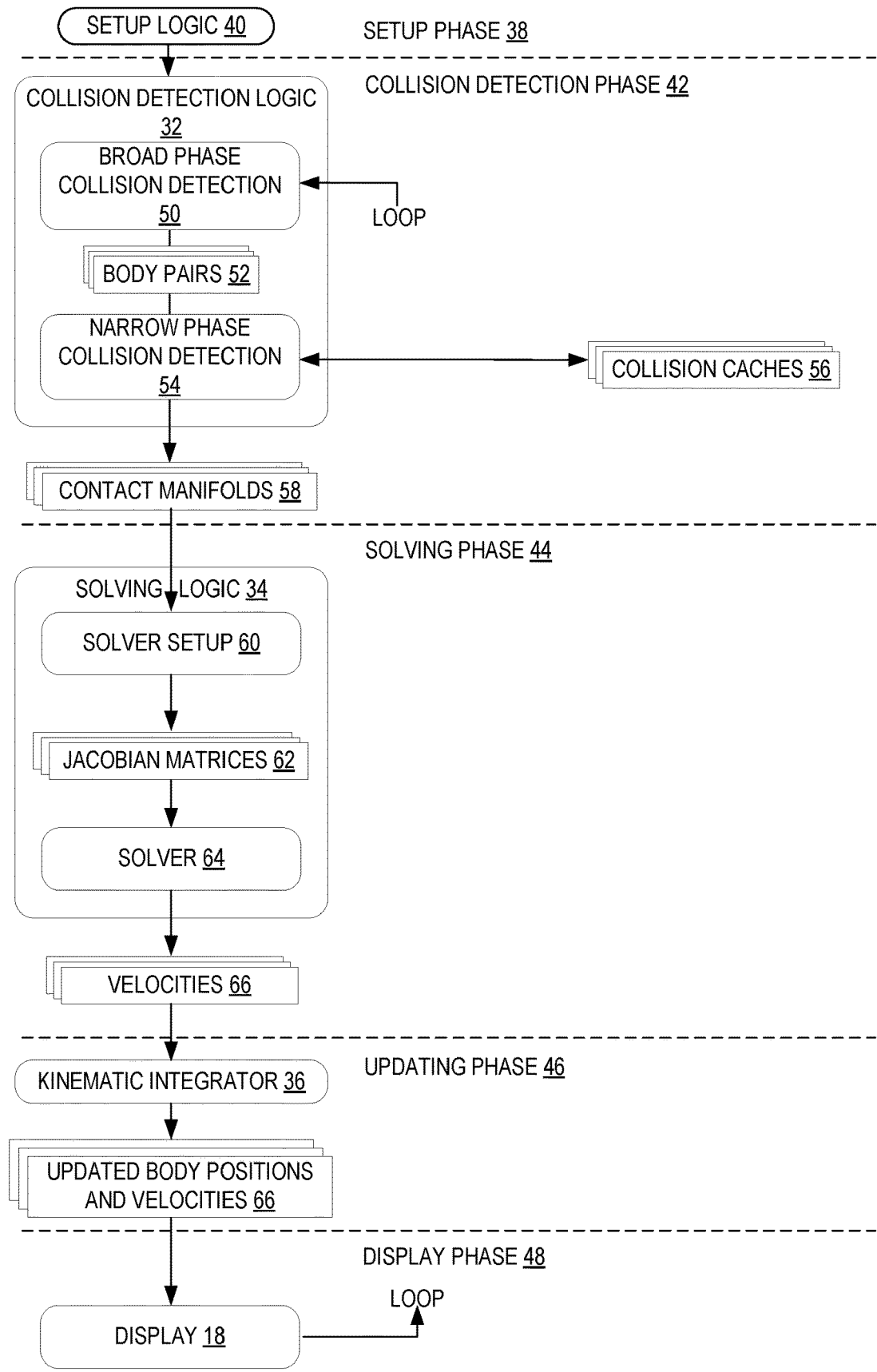
FIG. 2 shows a process flow that may be implemented by the computing device of FIG. 1 for a physics engine.

FIG. 2 illustrates a rigid body simulation by the physics engine 26 that uses an iterative solver. In one example, the physics engine 26 is stateless and deterministic, and uses an iterative solver, such as, for example, a Gauss-Seidel solver, or another type of iterative solver such as a Jacobian solver. In one example, the physics engine 26 is configured for a capped number of solver iterations of the iterative solver. In one example, the capped number of solver iterations is less than five. Specifically, the capped number of solver iterations may be four. However, it should be appreciated that the capped number of solver iterations may be set to other values, such as, for example, five, six, etc. By capping the number of solver iterations, the physics engine 26 may significantly reduce the resource requirements for the physics engine 26. Typically, iterative solvers require at least eight or more solver iterations to converge to an approximately stable solution. In contrast, by implementing the techniques described herein, the physics engine 26 may cap the number of solver iterations to four, while still converging to approximately stable solutions for simulated physical systems.

As discussed above, angular velocity changes produce from applying impulses to contact points when solving constraints may potentially produce artifacts in the simulated physical system, such as, for example, destabilization of a stack of rigid bodies. Typical physics engines introduce states for the solvers that are stored in memory such that the produced error/artifact may be remembered and mitigated in subsequent simulation steps. In one example, the physics engine 26 according to one embodiment of the present disclosure is stateless. As used herein, the term "stateless physics engine" is a physics engine that does not introduce extra state outside of the expected physical state consisting of body positions and velocity. For example, introducing states that include information regarding produced errors/artifacts during the solver phase would be an extra state, and such a physics engine would therefore not be "stateless". In order to mitigate the potential issues in simulating stacks of rigid bodies caused by angulars velocities produced by the solver when iteratively solving each constraint, the physics engine 26 may implement an inertia increasing technique, as will be described in more detail below. However, it should be appreciated that the inertia increasing techniques described herein are also applicable to example physics engines that introduce extra states. The inertia increasing techniques described herein improve convergence of iterative solvers, and reduce the number of solver iterations that may be required to converge to a stable solution.

As shown in FIG. 2, the simulation begins with a setup phase 38 implemented by setup logic 40 executed on processor 12, in which the objects and their positions, orientations and velocities are initially set prior to kinematic simulation. Following the setup phase 40, the simulation enters into a loop, during which a collision detection phase 42 and a solving phase 44 are iteratively executed by the collision detection logic 32 and solving logic 34 respectively. During the collision detection phase 42, contact information for touching bodies is generated, and during the solving phase 44 the system of body velocities and constraints imposed by contacts are computed. At the end of the solving phase 44, the forces are applied to the bodies in examples where the physics engine 26 is a force-based physics engine. In another example, the physics engine 26 may be a position-based physics engine, and at the end of the solving phase 44, the calculated changes in positions for each body may be applied. The positions and velocities of the bodies are updated in an updating phase 46. The results (i.e., a graphical representation of the updated positions of the bodies) are displayed in a display phase 48. Once the results are displayed, the process loops back to the collision detection phase 42. These phases will now be explained in more detail.

Collision Detection

The collision detection phase 42 generates contact points between any touching or nearly touching rigid bodies. Typically, this is done by a broad collision detection phase 50 which finds pairs 52 of potentially colliding bodies, then a narrow collision detection phase 54 which generates contact information for each pair 52 and stores it in a collision manifold 58, which is a data structure designed to hold data regarding each collision between a pair of bodies 52. The contact information stored in the collision manifold 58 may include information regarding constraints for each pair of bodies 52. For example, the contact information may include a separating plane, a separating normal vector, any number of contact point positions and their penetrating or separating distances (i.e., the positive (separating) or negative (penetrating) distances between the pair of bodies 52 at the point of contact). In some examples, the constraints may take the form of attachment points between pairs of bodies 52. However, it should be appreciated that other types of constraints may be identified during the collision detection phase 42 and information regarding those constraints may be stored in the contact manifolds 58. In order to improve convergence to a stable solution during the solving phase 44, some narrow phase and solver working data may be stored in the contact manifold and that data may be stored in permanent memory so it is accessible in subsequent simulation steps. In some examples, the physics engine 26 may be configured to delete that data at the end of the simulation step.

Solving Constraints

The solving phase 44 implemented by solver logic 34 first creates a set of mathematical constraints (known as Jacobian matrices or simply Jacobians) based on the generated contact manifolds. Solver setup 60 involves converting the position and velocity data for the rigid bodies into Jacobian matrices 62, which can be processed in a computationally efficient manner in real time by the solver 64. In one example, the constraints are velocity-based, meaning that they are constraints on the velocities of the two contacting bodies. The solver 64 then solves for all the body velocities 66 and constraints and finally applies the resulting impulses or forces back to the bodies. However, it should be appreciated that the solving logic 34 of the physics engine may implement other types of simulation logic. For example, in a position-based physics engine, the constraints may be position-based, meaning that they are constraints on the positions of the two contacting bodies and contact points between those contact bodies. The solver 64 may solve for all of the body positions and constraints, and apply changes in position on the bodies. As a change in position is being applied to the bodies over a discrete period of time covered by the simulation step, velocities for the bodies may also be derived in a position-based physics engine.

In real-time physics engines such as physics engine 26, it is typically too computationally expensive to solve an unbounded system of constraints simultaneously, so instead an iterative algorithm is employed by the solver 64, such as a Gauss-Seidel algorithm, a Jacobian algorithm, etc. Instead of solving all constraints at once, a Gauss-Seidel algorithm solves each constraint in turn, repeating the process several times, so that the solver 64 converges towards to a stable solution. In one example, the number of iterations of the solver 64 may be capped. For example, the number of iterations of the solver 64 per solving phase may be capped at less than five iterations. However, as discussed above, angular velocities produced by the solver 64 may potentially cause artifacts or other errors in the simulation of a stack of rigid bodies.

Angular Velocities

Figure 3B:
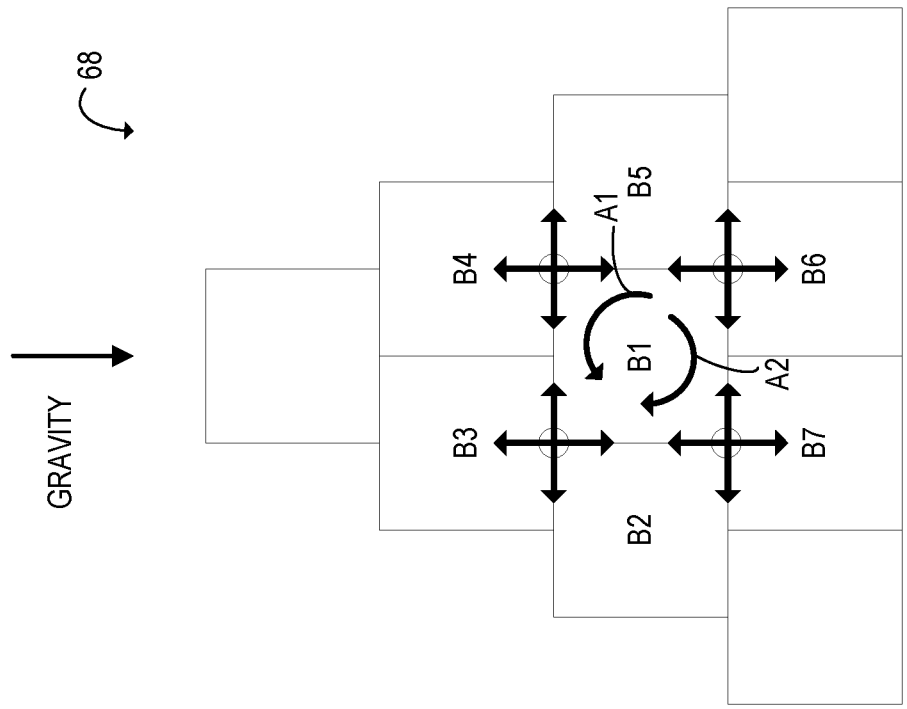
FIG. 3B shows a simplified diagram of a stack of bodies in a simulated physics system.
Figure 3A:
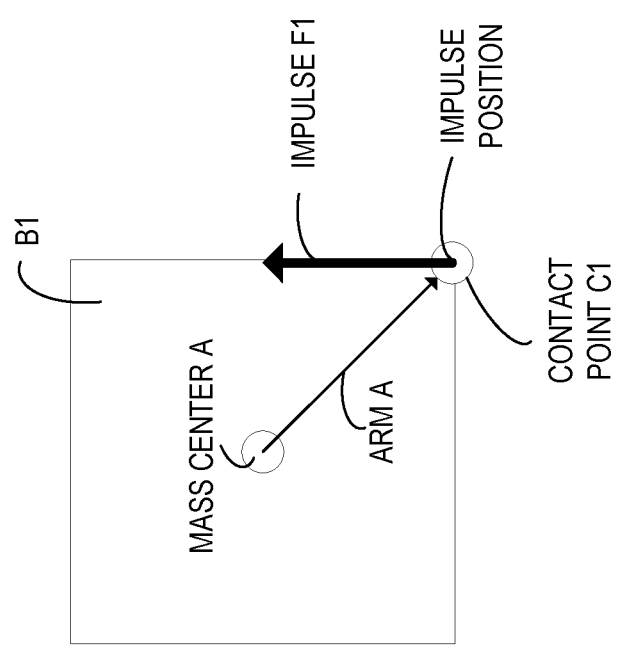
FIG. 3A shows a simplified diagram of an impulse being applied to a contact point for a body in a simulated physics system.

FIG. 3A illustrates an example impulse or force F1 applied to a contact point C1 for a body B1. As shown, applying the impulse or force F1 to the contact point C1 affects both linear and angular velocities of the body B1. The angular portion of the impulse or force may be calculated as follows.

$$angularImpulse = (impulsePosition - massCenter) \times impulse$$

Thus, the resulting angular velocity coming from the impulse or force F1 in the example illustrated in FIG. 3A increases with the distance of the impulse position to the mass center of the body B1.

FIG. 3B illustrates an example stack of rigid bodies 68 that includes bodies B1, B2, B3, B4, B5, B6, B7, etc. As shown, the body B1 in the middle of the stack 68 contacts neighboring bodies B2, B3, B4, B5, B6, and B7. Due to gravity, each of the contact points between the bodies in the stack 68 have a downward velocity that will cause penetration of those contact points. The solving logic 34 of the physics engine may iteratively solve for each of the pairs of colliding bodies 52 in the stack 68, including solving for each constraint between each of the pairs of colliding bodies 52. While solving constraints for each contact point between each pair of colliding bodies 52 using an iterative algorithm such as a Gauss-Seidel algorithm, forces or impulses are applied to the bodies and accumulated for each contact point. For example, to solve a non-penetration constraint, the solver may apply a force or impulse at a contact point to prevent penetration of that contact point into one of the colliding pairs of bodies. As another example, to solve an attachment constraint, the solver may apply a force or impulse to ensure that the contact point does not move relative to the two pairs of bodies. It should be appreciated that other types of constraints may be handled by the solver.

In the example illustrated in FIG. 3B, the solving logic 34 may be configured to apply impulse or forces to each of the contact points between the pairs of colliding bodies 52 in the stack 68 to counteract the downward velocities of each body due to gravity. The accumulation of these forces or impulses being applied to a body may result in an intermediate velocity for that body. That intermediate velocity may be used as input for a next step of constraint solving. As further constraints are solved, and further forces or impulses are applied to bodies, these intermediate velocities may be overwritten in the subsequent constraint solving steps. Thus, the intermediate velocities do not necessarily reflect a physical reality of the bodies. That is, a body that has not moved during a simulation step may have had a non-zero intermediate velocity at some point during the solving phase that was overwritten during a subsequent constraint solve. Similarly, a position-based physics engine may have intermediate positions and states of the bodies caused by applying changes in position to bodies based on constraint solving.

However, as discussed above, applying impulses or forces to these contact points may produce intermediate solver velocities that include angular velocities for the bodies in the stack 68 that will affect subsequent solving steps. For example, an impulse or force applied to the body B1 in the stack 68 illustrated in FIG. 3B for a first constraint solve may include an angular impulse or force A1 that is applied to the body B2. A subsequent impulse or force applied to the body B1 in the stack 68 for a second constraint solve may include an angular impulse or force A2 that is applied to the body B2. These angular impulses or forces will affect subsequent constraint solves during the solving phase, and may potentially lead to artifacts and cause unintended behavior such as, for example, the stack of rigid bodies 68 becoming unstable or sliding, potentially degrading user experience of the application.

Typically, to mitigate these types of artifact or unintended behavior, physics engines will introduce extra states for the simulation that are stored and used to monitor these errors and provide feedback to the solving process for the next simulation step. However, as discussed above, introducing extra states to propagate information about errors that occurred during the iterative solving has a number of drawbacks.

Introducing extra state to store information about each artifact/error that occurs during a particular solving step increases memory consumption, which increases as the number of colliding bodies increase. Further introducing extra states may potentially cause the physics engine to be non-deterministic. That is, simulations for the same initial setup of rigid bodies may have different results depending upon the extra states used in those simulations. This can happen if one of the simulations was created earlier than the other, causing the extra state to have a non-initial value in the first simulation at the time the second simulation is created, thereby making the simulation to appear non-deterministic. This issue of extra states affecting simulation results may cause significant problems for multi-player applications.

For example, multi-player applications may be implemented by computer systems that include a plurality of client devices in communication with a server device. Each client device may implement a client-side version of the application that locally renders visuals for display. Each client application may receive the local user's inputs and send those inputs to the server device. The server device may maintain a server-side state for the world of the application, and may send updates for the server-side state of the world to the client devices. In order to provide responsive inputs, rather than waiting for the user's inputs to be sent to the sever device and waiting for an update to the server-side state of the world before rendering a result of the user's inputs, the client application may be configured to maintain a client-side state of the world that immediately implement's the user's inputs. However, the client-side state of the world may not necessarily reflect the server-side state of the world. For example, a first user's input may change a result of a second user's input.

In order to maintain the same game state for each user, incorrect client-side states of the world may be rolled back and updated to reflect the server-side state of the world. However, in typical physics engines that use extra states to correct for the artifacts/errors discussed above, all of the data for those extra states needs to be rolled back as well in order to ensure a correct simulation of the game state on the client application. Also should a client join a game late, meaning that the server already has a non-initial value for the internal game state, these extra states for the physics engine increases the amount of data that need to be sent between the server-device and the client devices, and may significantly increase the complexity of rolling back and updating the simulation for the application.

As another example, due to the increased calculation complexity and the increased memory consumption of the extra states, it may be difficult to implement hardware accelerated solutions using graphics processing units (GPU) for these typical physics engines.

To address these issues, the physics engine 26 of the computing device 10 of the present disclosure is provided with an inertia scaling function. As discussed above, after solving each pair of colliding bodies 52, one or more of the bodies may have intermediate velocities due to impulses and forces applied for penetration recovery and prevention during the solving phase. In the simulation of a stack of rigid bodies, such as the example shown in FIG. 3B, linear velocity changes are useful to counteract the linear velocity each body has due to gravity. However, angular velocity changes in the intermediate velocities do not contribute to counteracting velocities due to gravity, and are thus "side-effects" that may potentially cause artifacts and unintended behavior that may destabilize a stack of rigid bodies that is intended to be stable. Implementation of the inertia scaling function may potentially minimize angular velocity changes caused by the applied impulses or forces, and improve convergence of the iterative solver.

Figure 4:
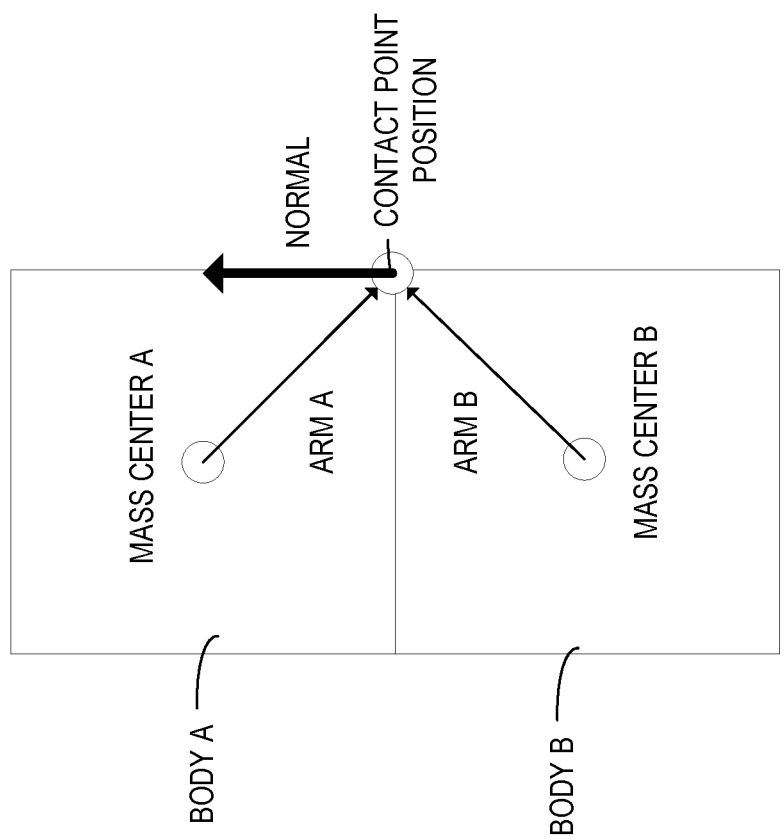
FIG. 4 shows a simplified diagram for calculating linear and angular velocities produced by an impulse being applied to a contact point in a simulated physics system.

Scaling of the inertia of a body may be used to increase the change in linear velocity and decrease the change in angular velocity from solving its contact constraints. FIG. 4 illustrates a pair of colliding bodies (body A, body B). The components illustrated in FIG. 4 may be used to calculate a point effective mass of the bodies, which is the ratio between the magnitude of an impulse at the contact point in the normal direction and the change in the point relative velocity in the normal direction. The point effective mass may be calculated as follows.

Arms of Rotation for Each Body:

$$armA = contactPointPosition - massCenterA$$

$$armB = contactPointPosition - massCenterB$$

Axis of Rotation for Each Body:

$$angularA = normal \times armA \text{ (cross product)}$$

$$angularB = armB \times normal \text{ (cross product)}$$

Mass (Scalar), Inertia and Inverted Inertia (3×3 Matrix)

$$invMassA = 1/MassOfBodyA;$$

$$invMassB = 1/MassOfBodyB;$$

$$invInertiaA = (InertiaMatrixA) - 1$$

$$invInertiaB = (inertiaMatrixB) - 1$$

$$sumInvMass = invMassA + invMassB$$

Point Effective Mass:

$$pointEffectiveMass = \frac{1}{(angularA \circ (invInertiaA * angularA) + angularB \circ (invInertiaB * angularB) + sumInvMass)}$$

∘—Dot product, ×—Cross product

To ensure zero relative velocity in the contact normal direction at the point of contact, the impulse (scalar) at the contact point that needs to be applied is calculated as:

$$relativeContactVelocity = linearVelocityA - linearVelocityB + angularA \circ angularVelocityA + angularA \circ angularVelocityA$$

$$relativeVelocity = normal \circ relativeContactVelocity$$

$$impulse = -(relativeVelocity + bias) * pointEffectiveMass$$

In one example, the bias may be set to non-zero to archive specific simulation behavior such as, for example, restitution.

The velocity changes for the bodies are calculated as:

$$linearVelocityA\mathrel{+}= normal * impulse * invMassA$$

$$linearVelocityB\mathrel{-}= normal * impulse * invMassB$$

$$angularVelocityA\mathrel{+}= impulse * angularA * invInertiaA$$

$$angularVelocityB\mathrel{+}= impulse * angularB * invInertiaB$$

Thus, increasing the point effective mass by increasing inertia will increase the linear velocity change and decrease the angular velocity. As can seen in the above equations, the point effective mass may be increased by reducing inverted inertia.

Figure 5:
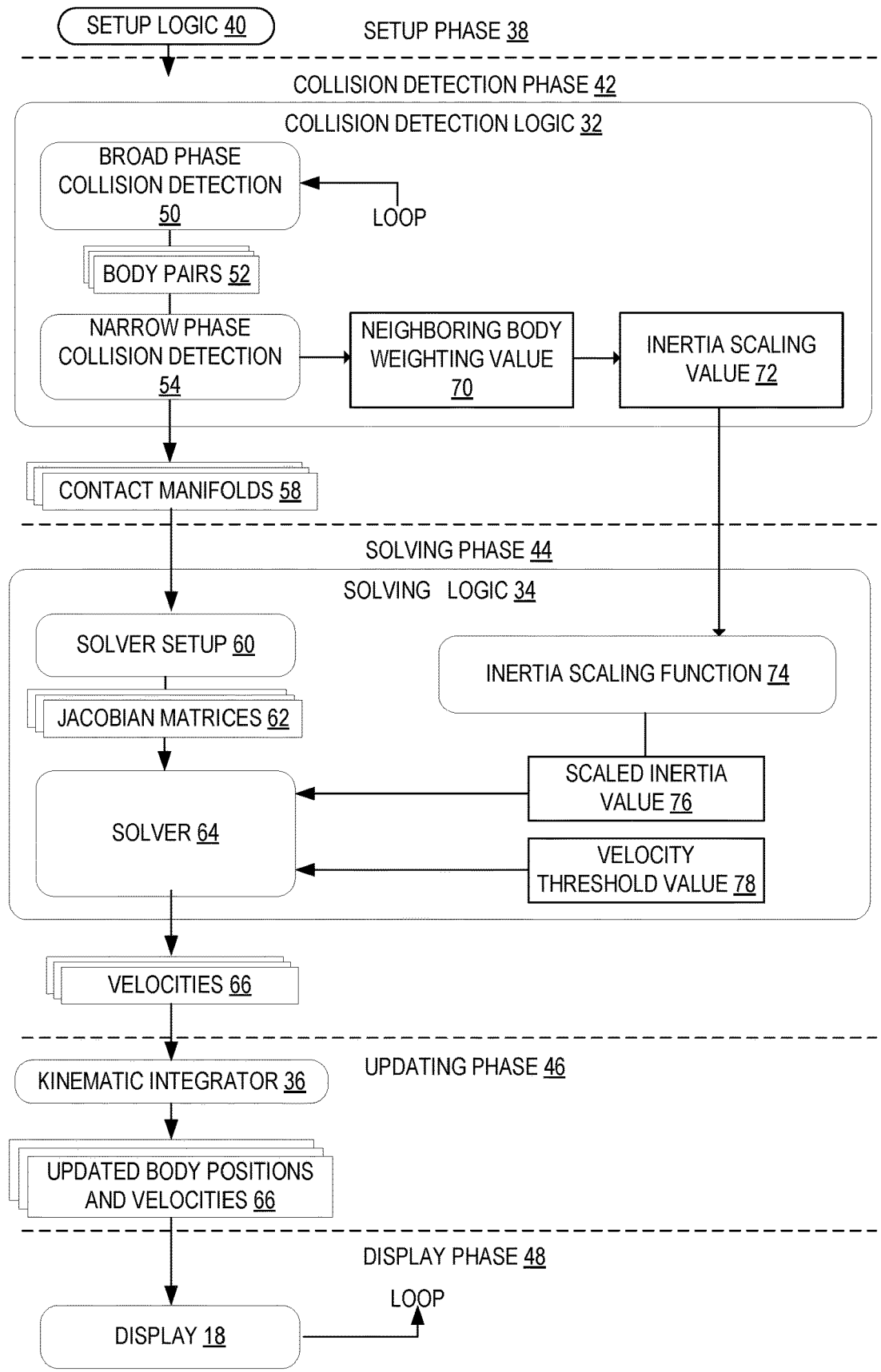
FIG. 5 shows a process flow that may be implemented by the computing device of FIG. 1 for a physics engine that implements an inertia scaling function.

However, if the inertia of every body in the simulated physical system is increased in a naïve manner, then the entire simulated physical system becomes more inertial, which may lead to incorrect behavior that is unintendedly too stable. To address these issues, the physics engine 26 of the computing device 10 of the present disclosure is provided with a heuristic for selectively scaling the inertia of bodies in the simulated physical system. As illustrated in FIG. 5, the setup phase 38, collision detection phase 42, constraint solving phase 44, updating phase 46, and display phase 48 are similar to that described above with relation to FIG. 2, except as described differently below.

In the setup phase 38, setup logic 40 sets initial values for the position, orientation, and velocity for the plurality of bodies in the physical simulation, in three-dimensional space of the simulation environment (e.g., game space). The physics engine 26 then iteratively loops through a collision detection phase 42, iterative solving phase 44, updating phase 46, and display phase 48, as shown. The phases occur iteratively, and the term "current" is used herein to refer to phases that occur in a current frame (i.e., timestep or simulation step).

In the current collision detection phase 42, broad phase collision detection 50 is performed to identify colliding pairs 52 of bodies of the plurality of bodies. Next, narrow phase collision detection 54 is performed for each identified pair 52, to determine collision information including a plurality of constraints for the identified colliding pairs of bodies 52. The plurality of constraints may include contact points between colliding pairs of bodies 52, and mathematical relationships/equations for those contact points that will be used for solving those constraints. Contact manifolds 58 are computed for each pair 52 of bodies by the collision detection logic, and passed to the solving logic 34. As illustrated in FIG. 4, before entering the solving phase 44, the collision detection logic 32 may be configured to determine a neighboring body weighting value 70 for one or more of the plurality of bodies in the simulated physical system. The neighboring body weighting value 70 may indicate how many other bodies are contacting, nearby, or otherwise influencing a particular body. That is, bodies that are in the middle of a stack/pile may be more "stuck", and the effects of increasing inertia on that body may less perceptible to a user viewing the stack. Techniques for calculating the neighboring body weighting value 70 will be discussed in more detail below.

Next, the collision detection logic 32 may be configured to determine an inertia scaling value 72 for the one or more of the plurality of bodies based on the neighboring body weighting value 70 for that body. As a specific example, the neighboring body weighting value 70 and the inertia scaling value 72 may be calculated as follows.

neighboringBody$WV$=numberContactPairs−1.0 inertiaScalingValue=1.0+0.2(neightboringBody$WV$)

In the example illustrated in FIG. 3B, the body B1 is contacting the bodies B2, B3, B4, B5, B6, and B7. Thus, the body B1 has 6 contact pairs, and the neighboring body weighting value 70 for the body B1 is 5, and the inertia scaling value 72 is 2. In this manner, the inertia of the body B1 may be scaled according to the scaling value, and would thus be doubled temporarily during the solving phase. Consequently, linear velocities resulting from impulses or forces applied to the body B1 would be increased, and angular velocities would be decreased. It should be appreciated that these calculation techniques for the neighboring body weighting value 70 and the inertia scaling value 72 are merely exemplary, and that other techniques may be used to calculate these values. Several additional example techniques will be discussed below.

In turn, the solving logic 34 runs an initial solver setup 60 in which the contact manifolds are converted from 3D space into solver space, by computing Jacobian matrices for the contact manifold 58 for each pair 52 of colliding bodies. In each current solving phase 44, for each pair 52 of bodies for which contact manifolds 58 are produced, the iterative solver 64 separately solves each constraint of those pairs 52 of bodies. Before solving each constraint of those pairs 52 of bodies, the solving logic 34 may be configured to scale an inertia value for a body of that colliding pair 52 of bodies based on the inertia scaling value 72. The solving logic 34 may include an inertia scaling function 74 configured to calculate a scaled inertia value 76 for that body. As a specific example, the inertia scaling function 74 may multiply the inertia value of a body by the inertia scaling value 72. However, it should be appreciated that other functions may be used when scaling inertia values.

The inertia is scaled temporarily for a duration of the current iterative solving phase 44. That is, the inertia of the one or more bodies may be scaled for the purposes of constraint solving, and then reset to the original inertia values. After scaling the inertias for the one or more bodies, the iterative solver 64 solves a constraint for a contact point between a colliding pair 52 of bodies using the scaled inertia value for the body of that colliding pair of bodies. As a specific example of constraint solving, the iterative solver 64 may enforce a non-penetration constraint for a contact point. The iterative solver 64 may calculate a point relative velocity for that contact point, and apply a force or impulse to that contact point based on the point relative velocity. If the inertia of that body has been scaled to be increased, then the linear velocity resulting from the applied force or impulse will also be increased, and the angular velocity resulting from the applied force or impulse will be decreased relative to the un-scaled inertia value, as discussed above with reference to FIG. 4.

The iterative solver 64 accumulates the results of the constraint solving, such as, for example, by accumulating applied forces or impulses for the constraint solves. The iterative solver 64 may perform several iterations. As discussed above, in one example, the iterative solver 64 may have a capped number of iterations, such as, for example, less than five iterations. By implementing the inertia scaling techniques described herein, the iterative solver 64 may converge to a stable solution for simulating a stack of rigid bodies within the capped number of iterations. In contrast, typical physics engines may require more than the capped number of iterations to converge on a stable solution, such as, for example, eight or more iterations of the physic engine's solver.

The positions and velocities of the bodies are then updated in the updating phase 46. The results (i.e., a graphical representation of the updated positions of the bodies) are then displayed in the display phase 48. Once the results are displayed, the physics engine 26 may proceed to the next simulation step, and the process loops back to the collision detection phase 42.

Several example techniques for calculating a neighboring body weighting value will now be described. FIG. 6A illustrates an example where the neighboring body weighting value 70 for the body B1 is determined based on a number of contact pairs of bodies. That is, the number of contact pairs of bodies may be the number of colliding pairs 52 of bodies that include the body B1. In the example illustrated in FIG. 6A, the body B1 has six contact pairs (B1, B2), (B1, B3), (B1, B4), (B1, B5), (B1, B6), and (B1, B7). In another example, the number of contact pairs for the body B1 may be determined based on a number of contact points between the body B1 and each other colliding pair of bodies.

FIGS. 6B and 6C illustrate an example where the neighboring body weighting value 70 for the body is determined based on a mass of one or more other bodies contacting the body. In FIG. 6B, the body B8 is contacting two bodies B9 and B10. In FIG. 6C, the body B11 is contacting two bodies B12 and B13. In these two examples, the bodies B9 and B10 have higher masses than the bodies B12 and B13. As the body B8 is surrounded by bodies that have a higher mass compared to the body B11, the body B8 may be more "stuck" and less likely to move in response to outside forces compared to the body B111. Thus, in this example, the physics engine 26 may be configured to determine a higher neighboring body weighting value for the body B8 compared to the body B11. For example, the neighboring body weighting value 70 may be scaled to both a number of contacting bodies and a total mass of those contacting bodies.

FIG. 7A illustrates an example where the neighboring body weighting value 70 for the body B1 is determined based on a number of forces or impulses that have been applied to the body. FIG. 7A shows several example impulses or forces that may have been applied to the body B1 during an iterative solving phase. These impulses or forces may be applied to each contact point between each colliding pair 52 of bodies that includes the body B1. The physics engine 26 may be configured to determine how many impulses or forces were applied to contact points between a particular body and other bodies contacting that particular body during a previous simulation, and determine the neighboring body weighting value 70 for that particular body in a current simulation step based on the determined number of impulses or forces from the prior simulation step.

FIGS. 7B and 7C illustrate an example where the neighboring body weighting value 70 for a body is determined based on a number of forces or impulses that have been applied to the body based on a number of other bodies that are located above the body. In FIG. 7B, the body B14 has three other bodies B15, B16, and B17 that are located above it relative to the space of the simulated physical system. In FIG. 7C, the body B18 has two other bodies B19 and B20 that are located above it relative to the space of the simulated physical system. The number of bodies located above a particular body may indicate how deep into a stack or pile that particular body is positioned, and thus how "stuck" that particular body is in the stack.

In these examples, even though the body B17 is not contacting the body B14, it may nonetheless be considered when determining the neighboring body weighting value 70 for the body B14. Accordingly, the neighboring body weighting value 70 determined for the body B14 may be higher than for the body B18.

It should be appreciated that the example techniques for determining neighboring body weighting values 70 for one or more bodies are merely exemplary, and that other techniques not specifically described herein may be implemented by the physics engine 26. For example, the neighboring body weighting value 70 may also be determined based on a number of other bodies in between a virtual camera that is viewing the simulation and a particular body. Additionally, it should be appreciated that the physics engine 26 may be configured to determine the neighboring body weighting value 70 via any suitable combination of the techniques described above.

The physics engine 26 may be configured to determine neighboring body weight values 70 for one or more bodies in the simulated physical system, determine corresponding inertia scaling values, and temporarily scale the inertias of each of those one or more bodies based on the inertia scaling value during a current iterative solving phase. In this manner, angular velocities produced by impulses or forces applied to contact points for constraint solving may be minimized, and linear velocities produced by those applied impulses or forces may be maximized. FIG. 8A illustrates an example of a stack 68 of rigid bodies being simulated without the inertia scaling techniques described herein. During the solving phase, angular velocities A1 and A2 for the body B1 may be produced during constraint solving.

Figure 8B:
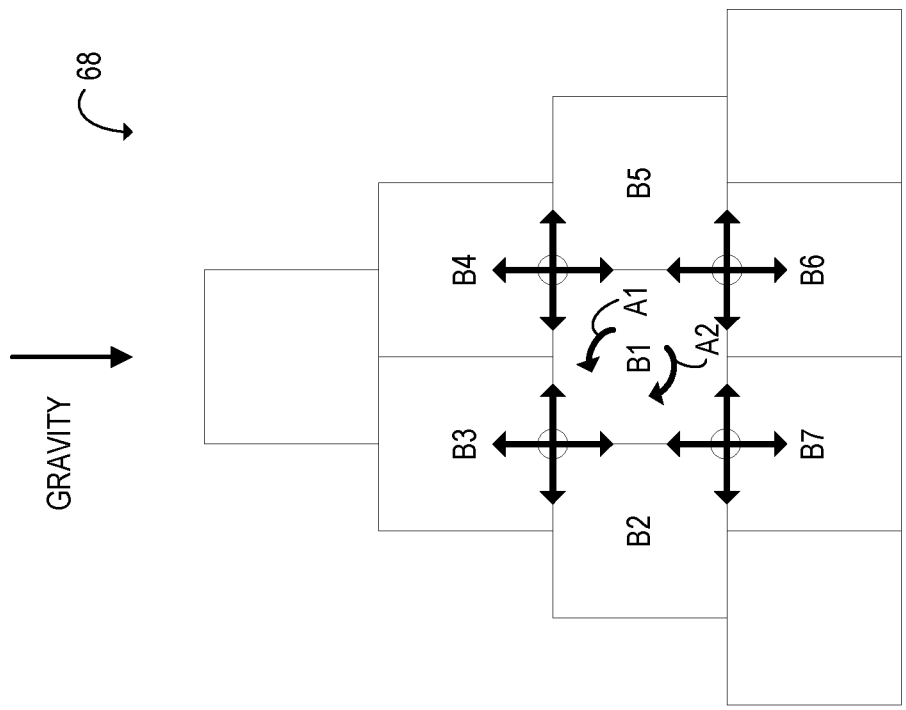
FIGS. 8A and 8B show simplified diagrams for a minimization of angular velocities produced from applied impulses using the inertia scaling function for the physics engine implemented by the computing device of FIG. 1.
Figure 8A:
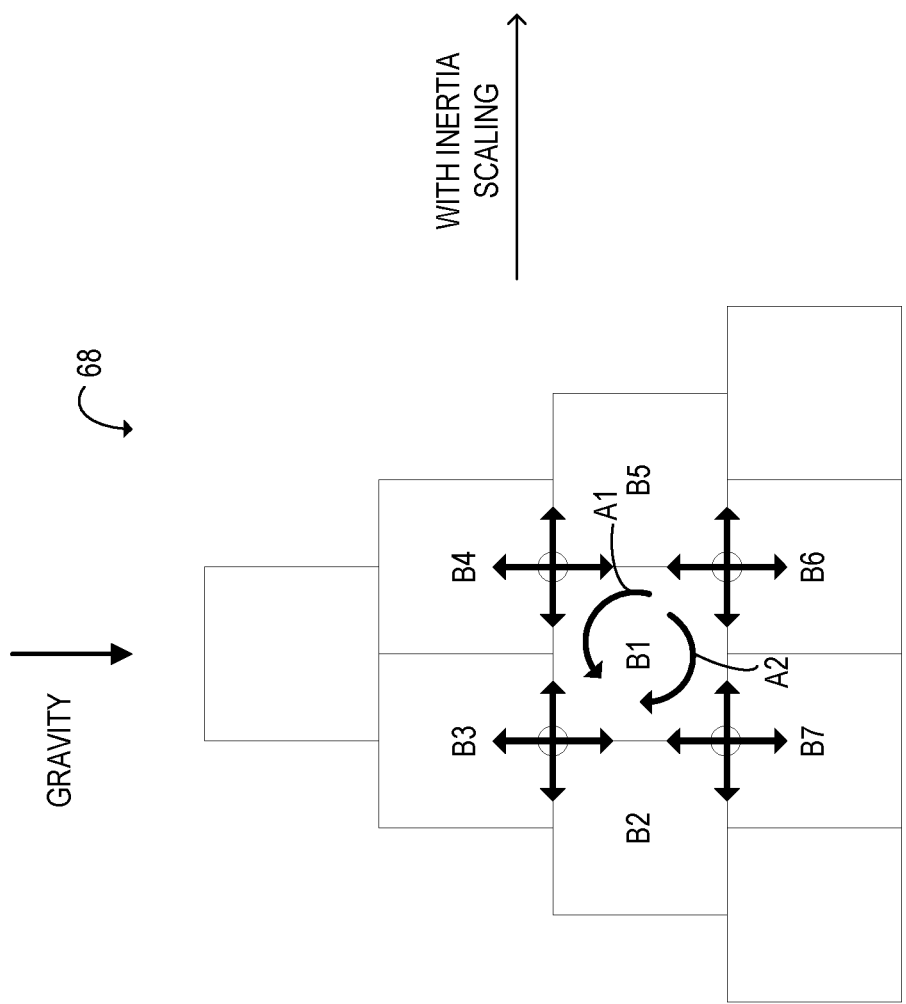

In contrast, FIG. 8B illustrates an example of the same stack 68 of rigid bodies being simulated with the inertia scaling techniques described herein. During the solving phase, the inertia of the body B1 is increased for the solving phase, and thus the same impulses and forces applied to contact points between the body B1 and the other contacting bodies produces smaller angular velocities A1 and A2 for the body B1. In this manner, the iterative solver may more effectively counteract the linear velocities of the bodies due to gravity while minimizing potential artifacts or errors that may occur due to angular velocities produced during constraint solving. By implementing the inertia scaling techniques described herein, the iterative solver 64 of the physics engine 26 may converge to a stable solution for example systems such as the stack 68 of rigid bodies in fewer iterations than typical physics engines.

In some cases, small artifacts or errors, such as unintended velocities on the bodies may still exist after performing a capped number of iterations of the iterative solver. In one example, as illustrated in FIG. 5, the iterative solver 64 may be further configured to perform velocity thresholding. For example, the solving logic 34 may be configured to determine a velocity threshold value 78 for the current iterative solving phase 44. The velocity threshold value 78 may be set such that velocities below the velocity threshold value 78 are set to zero, or otherwise reduced.

The solving logic 34 may be configured to determine the velocity threshold value 78 based on an estimated magnitude of potential artifacts or errors that may be produced during the solving phase. These artifacts or errors may occur due to floating point accuracy errors, a capped number of iterations of the iterative solver, and other sources of error. In one example, the velocity threshold value 78 may be determined at least based on a delta time of simulated physical system covered by the current iterative solving phase 44. That is, each simulation step may cover a particular amount of "time" of the simulation. In one example, the physics engine 26 may be configured to increase the velocity threshold value as the delta time for the simulation step increases, and similarly decrease the velocity threshold value as the delta time for the simulation step decreases. Additionally, in one example, the physics engine 26 may be configured to determine separate velocity threshold values for linear velocities and angular velocities.

As discussed above, the neighboring body weighting value may be a heuristic or estimation of how "stuck" a body is in a stack or pile. That is, bodies having a higher neighboring body weighting value may be less likely to move in the stack. Further, bodies having a higher neighboring body weighting value may be "deeper" into a stack or pile, and thus less perceptible to viewers in the simulation. Accordingly, in one example, the velocity threshold value 78 for the current iterative solving phase 44 may be scaled for one or more bodies based on the neighboring body weighting value 70 determined for the one or more bodies.

After determining the velocity threshold value 78 as discussed above, the physics engine 26 may be configured to determine that one or more bodies have a velocity with a smaller magnitude than the velocity threshold value 78, and reduce the velocity of the one or more bodies. In this manner, small velocities on the bodies occurring due to artifact or errors produced by the solving process may be dampened or otherwise reduced such that the simulated physical system is stable.

Figure 9:
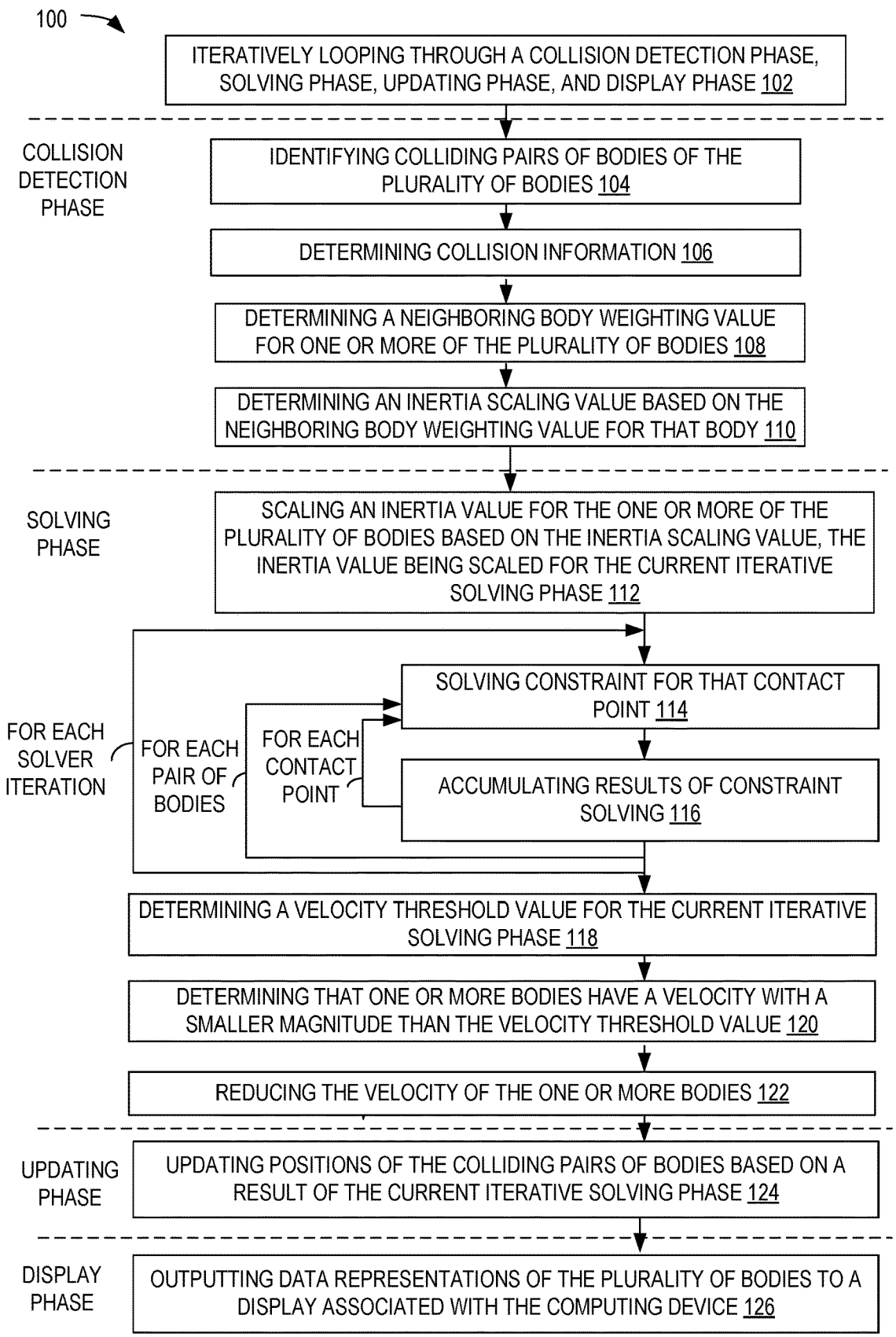
FIG. 9 is a flowchart of a method for a physics engine that implements an inertia scaling function, according to one embodiment of the present disclosure.

FIG. 9 is a flow chart of a method for use with a computing device that implements an inertia scaling technique for solving for rigid body dynamics. It will be appreciated that method 100 may be executed using the hardware describe above, or using other suitable hardware. For example, the method 100 may be executed at a physics engine 26 executed by a processor 12 of a computing device 10 to simulate rigid body dynamics of a simulated physical system including a plurality of bodies.

At 102, the method may include iteratively looping through a collision detection phase, solving phase, updating phase, and display phase. Steps 104-110 are executed in a collision detection phase. At 104, the method may include identifying colliding pairs of bodies of the plurality of bodies. At 106, the method may include, for each identified pair, determining collision information including a plurality of contact points for the identified colliding pairs of bodies. At 108, the method may include determining a neighboring body weighting value for one or more of the plurality of bodies. At 110, the method may include determining an inertia scaling value for the one or more of the plurality of bodies based on the neighboring body weighting value for that body.

Steps 112-120 are executed in an iterative solving phase. Steps 112-120 may be implemented by an iterative solver, such as, for example, a Gauss-Seidel solver, a Jacobian solver, etc. In one example, the solver may be configured to have a capped number of solver iterations. In one example, the capped number of solver iterations is less than five, more preferably four. At step 112, the method may include scaling an inertia value for the one or more of the plurality of bodies based on the inertia scaling value, the inertia value being scaled for the current iterative solving phase.

Steps 114-116 may be looped for each contact point for each pair of bodies for each solver iteration. At step 114, the method may include solving a constraint for that contact point using the scaled inertia value for the body of that colliding pair of bodies. At step 116, the method may include accumulating results of constraint solving.

At 118, the method may include determining a velocity threshold value for the current iterative solving phase, the velocity threshold value being determined at least based on a delta time of simulated physical system covered by the current iterative solving phase. In one example, the velocity threshold value for the current iterative solving phase may be scaled for one or more bodies based on the neighboring body weighting value for the one or more bodies. At 120, the method may include determining that one or more bodies have a velocity with a smaller magnitude than the velocity threshold value. At 122, the method may include reducing the velocity of the one or more bodies.

Step 124 is executed in an updating phase. At 124, the method may include updating positions of the colliding pairs of bodies based on a result of the current iterative solving phase.

Step 126 is executed in a display phase. At 126, the method may include outputting data representations of the plurality of bodies to a display associated with the computing device.

The method 100 may be implemented using a stateless and deterministic physics engine. The steps of the method 100 may be hardware accelerated using a GPU, or another type of hardware acceleration device.

While the illustrative embodiments have been described using two-dimensional graphics as examples for simplicity of explanation, it will be appreciated that the techniques described herein apply equally to three-dimensional representations.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
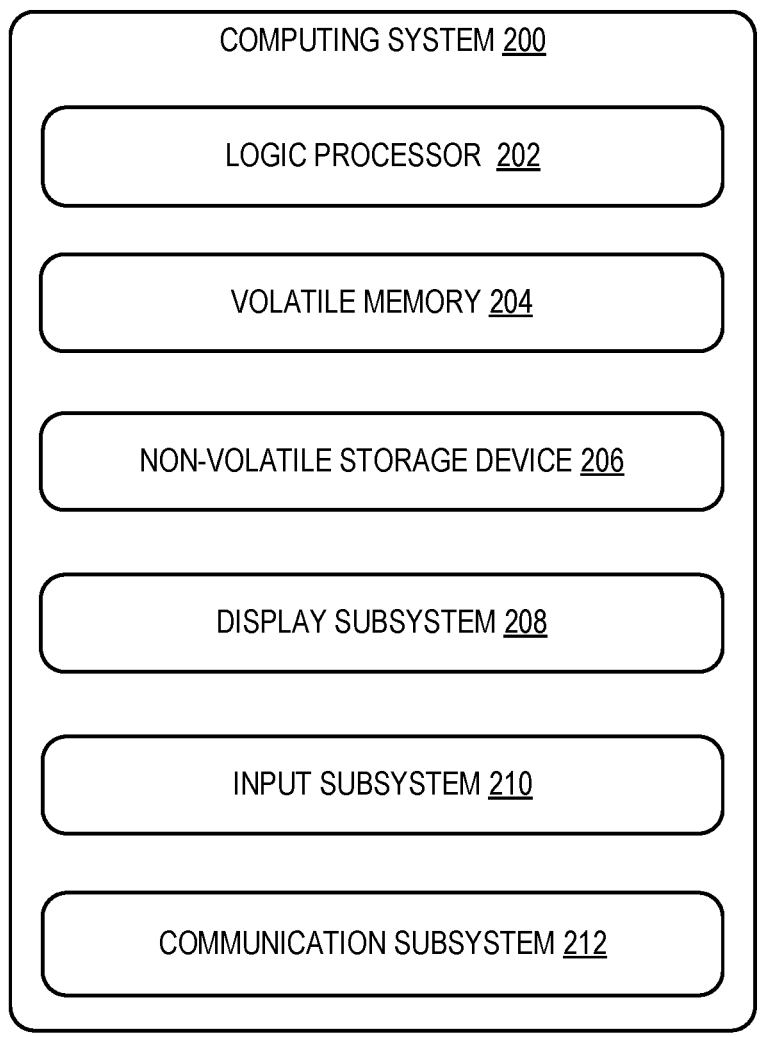
FIG. 10 is a schematic depiction of an example computer device that may be used as the computing device of FIG. 1.

FIG. 10 schematically shows a non-limiting embodiment of a computing system 200 that can enact one or more of the methods and processes described above. Computing system 200 is shown in simplified form. Computing system 200 may embody the computer device 10 described above and illustrated in FIG. 1. Computing system 200 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 200 includes a logic processor 202 volatile memory 204, and a non-volatile storage device 206. Computing system 200 may optionally include a display subsystem 208, input subsystem 210, communication subsystem 212, and/or other components not shown in FIG. 10.

Logic processor 202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 206 includes one or more physical devices configured to hold instructions executable by the logic processors to implement the methods and processes described herein. When such methods and processes are implemented, the state of non-volatile storage device 206 may be transformed—e.g., to hold different data.

Non-volatile storage device 206 may include physical devices that are removable and/or built-in. Non-volatile storage device 206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Volatile memory 204 may include physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Aspects of logic processor 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 200 typically implemented in software by a processor to perform a particular function using portions of volatile memory, which function involves transformative processing that specially configures the processor to perform the function. Thus, a module, program, or engine may be instantiated via logic processor 202 executing instructions held by non-volatile storage device 206, using portions of volatile memory 204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 208 may be used to present a visual representation of data held by non-volatile storage device 206. The visual representation may take the form of a graphical user interface (GUI). As the herein described methods and processes change the data held by the non-volatile storage device, and thus transform the state of the non-volatile storage device, the state of display subsystem 208 may likewise be transformed to visually represent changes in the underlying data. Display subsystem 208 may include one or more display devices utilizing virtually any type of technology. Such display devices may be combined with logic processor 202, volatile memory 204, and/or non-volatile storage device 206 in a shared enclosure, or such display devices may be peripheral display devices.

When included, input subsystem 210 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 212 may be configured to communicatively couple various computing devices described herein with each other, and with other devices. Communication subsystem 212 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 200 to send and/or receive messages to and/or from other devices via a network such as the Internet.

The following paragraphs provide additional support for the claims of the subject application. One aspect provides a computing device, comprising a processor configured to execute a physics engine to simulate rigid body dynamics of a simulated physical system including a plurality of bodies. The physics engine is configured to iteratively loop through a collision detection phase, an iterative solving phase, an updating phase, and a display phase. In a current collision detection phase, the physics engine is configured to identify colliding pairs of bodies of the plurality of bodies, determine collision information including a plurality of contact points for the identified colliding pairs of bodies, determine a neighboring body weighting value for one or more of the plurality of bodies, and determine an inertia scaling value for the one or more of the plurality of bodies based on the neighboring body weighting value for that body. In a current iterative solving phase, the physics engine is configured to scale an inertia value for the one or more of the plurality of bodies based on the inertia scaling value, the inertia value being scaled for the current iterative solving phase. Further in the current iterative solving phase, the physics engine is configured to, for each solver iteration, for one or more colliding pairs of bodies, for one or more contact points between that colliding pair of bodies, solve a constraint for that contact point using the scaled inertia value for the body of that colliding pair of bodies, and accumulate results of constraint solving. In an updating phase, the physics engine is configured to update positions of the colliding pairs of bodies based on a result of the current iterative solving phase. In a display phase, the physics engine is configured to output data representations of the plurality of bodies to a display associated with the computing device. In this aspect, additionally or alternatively, to solve a constraint between a pair of bodies, the physics engine may be configured to calculate a point relative velocity between the pair of bodies at a position of that contact point, apply a force or impulse to that contact point based on the point relative velocity, and accumulate applied forces or impulses for that colliding pair of bodies. In this aspect, additionally or alternatively, each iterative solving phase may include a capped number of solver iterations. In this aspect, additionally or alternatively, the capped number of solver iterations may be five or less. In this aspect, additionally or alternatively, the physics engine may be configured to determine the neighboring body weighting value for a body based on a number of contact pairs for the body. In this aspect, additionally or alternatively, the physics engine may be further configured to determine the neighboring body weighting value for the body based on a mass of one or more other bodies contacting the body. In this aspect, additionally or alternatively, the physics engine may be configured to determine the neighboring body weighting value for a body based on a number of forces or impulses that have been applied to the body. In this aspect, additionally or alternatively, the physics engine may be configured to determine the neighboring body weighting value for a body based on a number of other bodies that are located above the body. In this aspect, additionally or alternatively, the physics engine may be configured to determine a velocity threshold value for the current iterative solving phase, the velocity threshold value being determined at least based on a delta time of simulated physical system covered by the current iterative solving phase. The physics engine may be further configured to determine that one or more bodies have a velocity with a smaller magnitude than the velocity threshold value, and reduce the velocity of the one or more bodies. In this aspect, additionally or alternatively, the velocity threshold value for the current iterative solving phase may be scaled for one or more bodies based on the neighboring body weighting value for the one or more bodies.

Another aspect provides a method for use with a computing device, comprising, at a physics engine executed by a processor of the computing device to simulate rigid body dynamics of a simulated physical system including a plurality of bodies, iteratively loop through a collision detection phase, an iterative solving phase, updating phase, and display phase. In a current collision detection phase, the method further comprises identifying colliding pairs of bodies of the plurality of bodies, determining collision information including a plurality of contact points for the identified colliding pairs of bodies, determining a neighboring body weighting value for one or more of the plurality of bodies, and determining an inertia scaling value for the one or more of the plurality of bodies based on the neighboring body weighting value for that body. In a current iterative solving phase, the method further comprises scaling an inertia value for the one or more of the plurality of bodies based on the inertia scaling value, the inertia value being scaled for the current iterative solving phase. In the current iterative solving phase, the method further comprises, for each solver iteration, for one or more colliding pairs of bodies, for one or more contact points between that colliding pair of bodies, solving a constraint for that contact point using the scaled inertia value for the body of that colliding pair of bodies, and accumulating results of constraint solving. In an updating phase, the method further comprises updating positions of the colliding pairs of bodies based on a result of the current iterative solving phase. In a display phase, the method further comprises outputting data representations of the plurality of bodies to a display associated with the computing device. In this aspect, additionally or alternatively, solving a constraint between a pair of bodies may further comprise calculating a point relative velocity between the pair of bodies at a position of that contact point, applying a force or impulse to that contact point based on the point relative velocity, and accumulating applied forces or impulses for that colliding pair of bodies. In this aspect, additionally or alternatively, each iterative solving phase may include a capped number of solver iterations. In this aspect, additionally or alternatively, the capped number of solver iterations may be five or less. In this aspect, additionally or alternatively, the method may further comprise determining the neighboring body weighting value for a body based on a number of contact pairs for the body. In this aspect, additionally or alternatively, the method may further comprise determining the neighboring body weighting value for the body based on a mass of one or more other bodies contacting the body. In this aspect, additionally or alternatively, the method may further comprise determining the neighboring body weighting value for a body based on a number of forces or impulses that have been applied to the body. In this aspect, additionally or alternatively, the method may further comprise determining the neighboring body weighting value for a body based on a number of other bodies that are located above the body. In this aspect, additionally or alternatively, the method may further comprise determining a velocity threshold value for the current iterative solving phase, the velocity threshold value being determined at least based on a delta time of simulated physical system covered by the current iterative solving phase. The method may further comprise determining that one or more bodies have a velocity with a smaller magnitude than the velocity threshold value, and reducing the velocity of the one or more bodies, wherein the velocity threshold value for the current iterative solving phase may be scaled for one or more bodies based on the neighboring body weighting value for the one or more bodies.

Another aspect provides a computing device, comprising a processor configured to execute a physics engine to simulate rigid body dynamics of a simulated physical system including a plurality of bodies. The physics engine is configured to iteratively loop through a collision detection phase, an iterative solving phase, updating phase, and display phase. In a current collision detection phase, the physics engine is configured to identify colliding pairs of bodies of the plurality of bodies, determine collision information including a plurality of contact points for the identified colliding pairs of bodies, determine a neighboring body weighting value for one or more of the plurality of bodies, and determine a velocity threshold value for the one or more of the plurality of bodies based on at least the determine neighboring body weighting value. In a current iterative solving phase, the physics engine is configured to for each solver iteration, for one or more colliding pairs of bodies, for one or more contact points between that colliding pair of bodies, solve a constraint for that contact point, and accumulate results of constraint solving. In the current iterative solving phase, the physics engine is configured to determine that one or more bodies have a velocity with a smaller magnitude than the velocity threshold value, and reduce the velocity of the one or more bodies. In an updating phase, the physics engine is configured to update positions of the colliding pairs of bodies based on a result of the current iterative solving phase. In a display phase, the physics engine is configured to output data representations of the plurality of bodies to a display associated with the computing device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
a memory device; and
a processor configured to execute a stateless physics engine to perform real-time simulation of rigid body dynamics of a simulated physical system including a plurality of bodies having respective positions and orientations within the simulated physical system, the stateless physics engine being configured to:
iteratively loop through a collision detection phase, an iterative solving phase, updating phase, and a display phase;
in a current collision detection phase:
identify colliding pairs of bodies of the plurality of bodies;
determine collision information including a plurality of contact points for the identified colliding pairs of bodies;
store the collision information in a contact manifold stored in the memory device;
determine a neighboring body weighting value for one or more of the plurality of bodies based at least in part on the collision information in the stored contact manifold, the collision information including one or more respective numbers of contact pairs for the one or more of the plurality of bodies; and
determine an inertia scaling value for the one or more of the plurality of bodies based on the neighboring body weighting value for that body;
in a current iterative solving phase:
scale an inertia value for the one or more of the plurality of bodies based on the inertia scaling value; and
calculate one or more respective changes in linear velocities and one or more respective changes in angular velocities of the one or more of the plurality of bodies based on the scaled inertia value, the scaled inertia value causing an increase in the one or more respective changes in linear velocities and causing a decrease in the one or more respective changes in angular velocities of the one or more of the plurality of bodies for the current iterative solving phase to thereby inhibit motion artifacts in the respective positions of the one or more of the plurality of bodies;
for each solver iteration:
for one or more colliding pairs of bodies:
for one or more contact points between that colliding pair of bodies:
solve a constraint for that contact point using the scaled inertia value and the calculated one or more respective changes in linear velocities and one or more respective changes in angular velocities for the body of that colliding pair of bodies; and
accumulate results of constraint solving;
in an updating phase:
update the positions and the orientations of the bodies based on a result of the current iterative solving phase; and
in a display phase:
output data representations of the plurality of bodies with the updated positions and orientations, as viewed from a virtual camera position, for display at a display associated with the computing device.

2. The computing device of claim 1, wherein to solve a constraint between a pair of bodies, the stateless physics engine is configured to:
calculate a point relative velocity between the pair of bodies at a position of that contact point;
apply a force or impulse to that contact point based on the point relative velocity; and
accumulate applied forces or impulses for that colliding pair of bodies.

3. The computing device of claim 1, wherein each iterative solving phase includes a capped number of solver iterations.

4. The computing device of claim 3, wherein the capped number of solver iterations is five or less.

5. The computing device of claim 1, wherein the stateless physics engine is further configured to determine the neighboring body weighting value for a body based on a mass of one or more other bodies contacting the body.

6. The computing device of claim 1, wherein the stateless physics engine is configured to determine the neighboring body weighting value for a body based on a number of forces or impulses that have been applied to the body.

7. The computing device of claim 1, wherein the stateless physics engine is configured to determine the neighboring body weighting value for a body based on a number of other bodies that are located above the body.

8. The computing device of claim 1, wherein the stateless physics engine is configured to:
determine a velocity threshold value for the current iterative solving phase, the velocity threshold value being determined at least based on a delta time of simulated physical system covered by the current iterative solving phase; and
determine that one or more bodies have a velocity with a smaller magnitude than the velocity threshold value; and
reduce the velocity of the one or more bodies.

9. The computing device of claim 8, wherein the velocity threshold value for the current iterative solving phase is scaled for one or more bodies based on the neighboring body weighting value for the one or more bodies.

10. A method for use with a computing device, comprising:
at a stateless physics engine executed by a processor of the computing device to perform real-time simulation of rigid body dynamics of a simulated physical system including a plurality of bodies having respective positions and orientations within the simulated physical system:

iteratively loop through a collision detection phase, an iterative solving phase, updating phase, and display phase;
in a current collision detection phase:
identifying colliding pairs of bodies of the plurality of bodies;
determining collision information including a plurality of contact points for the identified colliding pairs of bodies;
storing the collision information in a contact manifold stored in a memory device;
determining a neighboring body weighting value for one or more of the plurality of bodies based at least in part on the collision information in the stored contact manifold, the collision information including one or more respective numbers of contact pairs for the one or more of the plurality of bodies; and
determining an inertia scaling value for the one or more of the plurality of bodies based on the neighboring body weighting value for that body;
in a current iterative solving phase:
scaling an inertia value for the one or more of the plurality of bodies based on the inertia scaling value and
calculating one or more respective changes in linear velocities and one or more respective changes in angular velocities of the one or more of the plurality of bodies based on the scaled inertia value, the scaled inertia value being scaled causing an increase in the one or more respective changes in linear velocities and causing a decrease in the one or more respective changes in angular velocities of the one or more of the plurality of bodies for the current iterative solving phase to thereby inhibit motion artifacts in the respective positions of the one or more of the plurality of bodies;
for each solver iteration:
for one or more colliding pairs of bodies:
for one or more contact points between that colliding pair of bodies:
solving a constraint for that contact point using the scaled inertia value and the calculated one or more respective changes in linear velocities and one or more respective changes in angular velocities for the body of that colliding pair of bodies; and
accumulating results of constraint solving;
in an updating phase:
updating the positions and the orientations of the colliding pairs of bodies based on a result of the current iterative solving phase; and
in a display phase:
outputting data representations of the plurality of bodies with the updated positions and orientations, as viewed from a virtual camera position, for display at a display associated with the computing device.

11. The method of claim 10, wherein solving a constraint between a pair of bodies further comprises:
calculating a point relative velocity between the bodies at a position of that contact point;
applying a force or impulse to that contact point based on the point relative velocity; and
accumulating applied forces or impulses for that colliding pair of bodies.

12. The method of claim 11, further comprising determining the neighboring body weighting value for a body based on a mass of one or more other bodies contacting the body.

13. The method of claim 10, wherein each iterative solving phase includes a capped number of solver iterations.

14. The method of claim 13, wherein the capped number of solver iterations is five or less.

15. The method of claim 10, further comprising determining the neighboring body weighting value for a body based on a number of forces or impulses that have been applied to the body.

16. The method of claim 10, further comprising determining the neighboring body weighting value for a body based on a number of other bodies that are located above the body.

17. The method of claim 10, further comprising:
determining a velocity threshold value for the current iterative solving phase, the velocity threshold value being determined at least based on a delta time of simulated physical system covered by the current iterative solving phase;
determining that one or more bodies have a velocity with a smaller magnitude than the velocity threshold value;
reducing the velocity of the one or more bodies; and
wherein the velocity threshold value for the current iterative solving phase is scaled for one or more bodies based on the neighboring body weighting value for the one or more bodies.

18. A computing device, comprising:
a memory device; and
a processor configured to execute a stateless physics engine to perform real-time simulation of rigid body dynamics of a simulated physical system including a plurality of bodies having respective positions and orientations within the simulated physical system, the stateless physics engine being configured to:
iteratively loop through a collision detection phase, an iterative solving phase, updating phase, and display phase;
in a current collision detection phase:
identify colliding pairs of bodies of the plurality of bodies;
determine collision information including a plurality of contact points for the identified colliding pairs of bodies;
store the collision information in a contact manifold stored in the memory device;
determine a neighboring body weighting value for one or more of the plurality of bodies based at least in part on the collision information in the stored contact manifold, the collision information including one or more respective numbers of contact pairs for the one or more of the plurality of bodies; and
determine a velocity threshold value for the one or more of the plurality of bodies based on at least the determine neighboring body weighting value;
in a current iterative solving phase:
for each solver iteration:
for one or more colliding pairs of bodies:
for one or more contact points between that colliding pair of bodies:
solve a constraint for that contact point; and
accumulate results of constraint solving;

determine that one or more bodies have a velocity with a smaller magnitude than the velocity threshold value; and
reduce the velocity of the one or more bodies to thereby inhibit motion artifacts in the respective positions of the plurality of bodies;

in an updating phase:
update the positions of the colliding pairs of bodies based on a result of the current iterative solving phase; and in a display phase:
output data representations of the plurality of bodies with the updated positions, as viewed from a virtual camera position, for display at a display associated with the computing device.

* * * * *